US010272587B2

(12) United States Patent
Heck et al.

(10) Patent No.: US 10,272,587 B2
(45) Date of Patent: Apr. 30, 2019

(54) SLICING MACHINE WITH WEIGHING DEVICE (71) Applicant: Bizerba SE & Co. KG, Balingen (DE)

(72) Inventors: Michael Heck, Balingen (DE); Manfred Dinger, Balingen (DE)

(73) Assignee: BIZERBA SE & CO. KG, Balingen (DE)

( * ) Notice: Subject to any disclaimer, the term of this patent is extended or adjusted under 35 U.S.C. 154(b) by 124 days.

(21) Appl. No.: 15/310,272

(22) PCT Filed: May 6, 2015

(86) PCT No.: PCT/EP2015/059918
§ 371 (c)(1),
(2) Date: Nov. 10, 2016

(87) PCT Pub. No.: WO2015/173084
PCT Pub. Date: Nov. 19, 2015

(65) Prior Publication Data
US 2017/0144322 A1 May 25, 2017

(30) Foreign Application Priority Data
May 15, 2014 (DE) .................. 10 2014 106 856

(51) Int. Cl.
G01G 19/56 (2006.01)
G01G 19/52 (2006.01)
(Continued)

(52) U.S. Cl.
CPC ................ B26D 7/30 (2013.01); B26D 1/15 (2013.01); G01G 19/4144 (2013.01);
(Continued)

(58) Field of Classification Search
CPC .... G01G 19/4144; G01G 19/56; G01G 19/52; B26D 7/30; B26D 1/15; B26D 2210/02; B26D 2003/285
(Continued)

(56) References Cited

U.S. PATENT DOCUMENTS 4,763,738 A    8/1988   Kuchler
4,867,257 A    9/1989   Kuchler
(Continued)

FOREIGN PATENT DOCUMENTS

DE     395397 C      5/1924
DE     8807446 U1   11/1988
(Continued)

OTHER PUBLICATIONS

German Search Report for Application No. 102014106856.4 dated Mar. 12, 2015.
(Continued)

Primary Examiner — Jacques M Saint Surin
(74) Attorney, Agent, or Firm — Leydig, Voit & Mayer, Ltd.

(57) ABSTRACT

A slicing machine may include a machine housing, which holds a drive motor for driving a rotating slicing blade. The slicing blade separates individual slices from preferably elongated foodstuffs, wherein these slices are deposited in a delivery area of the slicing machine. In the delivery area, a weighing device is provided, which determines the weight of the separated slices. To ensure that the slicing machine can be universally employed while having a compact design, it is provided that the slicing machine is of modular design in that the weighing device is configured as a separate modular unit, which can optionally be mechanically rigidly connected to the machine housing or can be removed therefrom.

18 Claims, 5 Drawing Sheets (51) Int. Cl.
*B26D 1/15* (2006.01)
*B26D 3/28* (2006.01)
*B26D 7/30* (2006.01)
*G01G 19/414* (2006.01)

(52) U.S. Cl.
CPC ............ *G01G 19/52* (2013.01); *G01G 19/56* (2013.01); *B26D 2003/285* (2013.01); *B26D 2210/02* (2013.01)

(58) Field of Classification Search
USPC .......................................................... 177/238
See application file for complete search history.

(56) References Cited

U.S. PATENT DOCUMENTS

| | | | | |
|---|---|---|---|---|
| 5,649,463 | A | * | 7/1997 | Lindee ................ B26D 1/0006 83/174 |
| 5,666,866 | A | | 9/1997 | Huang et al. |
| 6,968,767 | B2 | * | 11/2005 | Yu ...................... B23D 45/067 83/473 |
| 2004/0149098 | A1 | * | 8/2004 | Freudinger .............. B26D 1/46 83/155 |
| 2006/0219069 | A1 | * | 10/2006 | Skaar .................. B26D 7/0683 83/13 |
| 2013/0133498 | A1 | * | 5/2013 | Klingler ................ B26D 1/143 83/591 |

FOREIGN PATENT DOCUMENTS

| | | | |
|---|---|---|---|
| DE | 3836859 | A1 | 5/1990 |
| DE | 29804979 | U1 | 7/1998 |
| DE | 102004044665 | A1 | 3/2006 |
| DE | 202007006209 | U1 | 6/2008 |
| DE | 102010034299 | * | 2/2012 |
| DE | 102014106856 | * | 11/2015 |
| EP | 0216754 | A1 | 4/1987 |
| EP | 0767724 | A1 | 4/1997 |
| EP | 1637296 | A1 | 3/2006 |

OTHER PUBLICATIONS

International Search Report for PCT/EP2015/059918 dated Aug. 13, 2015.

* cited by examiner

SLICING MACHINE WITH WEIGHING DEVICE

CROSS REFERENCE TO RELATED APPLICATIONS

The present application is a national phase entry under 35 U.S.C. § 371 of International Application No. PCT/EP2015/059918 filed May 6, 2015, published in German, which claims priority from German Patent Application No. 10 2014 106 856.4 filed May 15, 2014, the disclosures of which are incorporated by reference herein.

The invention relates to a slicing machine with weighing device according to the features of the preamble of claim 1.

A slicing machine of this type is known e.g. from DE 88 07 446 U1. This slicing machine has a weighing unit with a display integrated into the slicing machine. The weighing unit is mounted on a base plate, which can be arranged in the vicinity of the slicing machine or inserted into a mounting of the slicing machine. In this mounting, the base plate is supported in a manner that may be described as floating. The weighing unit is connected via a U-shaped clamp to a removable load plate, wherein the load plate is arranged in the delivery area of the slicing machine. It is a disadvantage of this solution that, with the option of positioning the weighing unit on the one hand via a floating support in the housing and on the other hand next to the slicing machine, the weighing result is negatively affected. It is therefore very unlikely for this scale to be approved as a calibratable scale or a scale suitable for the sale of fresh food products.

From DE 38 36 859 A1, a slicing machine attached to a retail scale is known. A reading unit arranged in the vicinity of the slicing machine's support for products to be sliced detects the class of goods or price of products to be sliced which are placed on the support for products to be sliced. A delivery tray configured as a load carrier detects the weight of the sliced goods. The delivery tray is configured as a load carrier of a shop scale and is connected to the shop scale. The shop scale is set up separately from the slicing machine.

From DE 20 2007 006 209 U1 a slicing machine with a scale configured as a retail scale is likewise known. The scale has a weighing plate configured as a load carrier, which is placed on a flat surface at the top of the slicing machine. The weighing result is indicated by means of a display device integrated into the slicing machine, which device has an operator display and a customer display. An integration of the load carrier into the slicing machine is not provided in these weighing units, which are approved for sale.

EP 0 767 724 B1 shows a slicing machine with a weighing device rigidly integrated into the slicing machine. The weighing device is mounted in the housing of the slicing machine below the delivery area. The application of force takes place through an aperture arranged in the delivery area of the slicing machine housing. This aperture can be sealed only with great difficulty. Thus, on the one hand a seal in this area leads to the risk of a force shunt, and therefore an inaccurate measurement result, and on the other hand the weighing apparatus can be contaminated through the aperture.

The invention achieves the object of creating a slicing machine which is of compact design and can be universally employed. In particular, the slicing machine should be of modular design and optionally capable of being expanded. At the same time, the slicing machine should comprise a saleable weighing apparatus and should preferably meet high standards of hygiene.

This object is achieved according to the invention by a slicing machine according to the features of claim 1 and by a method for the production of a slicing machine according to the features of claim 33.

The slicing machine according to the invention is configured such that the weighing device is configured as a separate modular unit, which can optionally be mechanically rigidly connected to the machine housing. This is accomplished in that the load carrier comprises a bending beam with a fixed end and a moveable end, wherein the moveable end can be removably and mechanically rigidly connected to the load plate and the fixed end, either indirectly, e.g. via a weighing frame, or immediately or directly, to the machine housing.

It is advantageous here for the weighing device to be mechanically rigidly connected to the machine housing and integrated therein, or arranged in an installation space within the machine housing. As a result, the slicing machine according to the invention requires only a very small space in which to be set up. The slicing machine can be expanded in modular fashion with the weighing device. In particular, it can also be operated without the weighing device and, to meet different requirements, different weighing devices can be inserted. Thus, e.g. for different load ranges, appropriately adapted weighing devices can be provided.

The weighing device is configured as a separate modular unit. This means that the weighing device is configured as a stand-alone module, which can be exchanged and in particular requires no electrical connection to the slicing machine. This facilitates an exchange or an equipping of the slicing machine with the weighing device. In addition, the slicing machine operates unimpaired in its basic function regardless of whether or not the weighing device is inserted into the slicing machine.

The bending beam of the weighing device can be configured as an EMC (electromagnetic force compensation) load carrier or as an SG (strain gauge) load carrier. Likewise, the bending beam can have a load carrier which is configured according to the vibrating string principle.

It is provided that the weighing device is configured as a weighing device which is approved for sale and/or approved and/or capable of being approved from a calibration viewpoint. Approved for sale or capable of being approved from a calibration viewpoint means that the weighing device is configured to comply with the regulations or calibration laws of a respective country and can therefore be calibrated and approved by a calibration authority.

According to the invention, it is provided that, during the production of the slicing machine, the weighing device is calibrated outside the slicing machine and inserted into the slicing machine and mechanically rigidly connected thereto after the calibrating operation.

The procedure for calibrating the weighing device can be that the weighing device is inserted into a mounting device for calibration and, in the mounting device, it is mechanically rigidly and removably connected to the mounting device at the same fixing points with which the weighing device is subsequently fixed in the slicing machine. This permits simple and, in particular, automatic calibration of the weighing device.

To prevent manipulation or sabotage of the weighing device, it can be provided that the weighing device is equipped with a seal outside the slicing machine on completion of the calibration operation. The seal can be configured as a mechanical seal or as a software seal.

It is provided that the weighing device is of modular and, in particular, expandable configuration, i.e. it can be connected to or can cooperate with further components. In particular, the weighing device can cooperate with a network of scales having one or more shop scales or can be connected to further components. For this purpose, it is provided that after installation in the slicing machine, the weighing device is connected via an interface to a display unit and a printer and/or a CPU unit. The CPU unit can be a central control unit which has a microprocessor and on which control processes or utility programs for the scale are executed.

In one embodiment, it can be provided that the slicing machine is configured for separating off slices of elongated foodstuffs. It has a machine housing, which holds a drive motor and a rotating slicing blade driven by the drive motor. A delivery area arranged in the vicinity of the slicing blade is provided for delivery of the slices that have been separated off. A weighing device is arranged in an installation space of the machine housing arranged below the delivery area and comprises a load carrier and a load plate arranged in the delivery area. The slices that have been separated off are placed on to the load plate.

For a particularly good, simple fixing of the weighing device, it can be provided that the machine housing has at least two mountings in the installation space for the removable fixing of the weighing device, and the mountings are configured as screw mountings and/or snap mountings and/or bayonet mountings. For example, the at least two mountings can be arranged on the underside of a base plate of the machine housing, wherein the top of the base plate is directed towards the delivery area and the underside of the base plate closes off the top of the installation space.

In one embodiment it can be provided that the bending beam of the weighing device is fixed with its fixed end in a weighing frame of the weighing device and the weighing frame has at least two fixings corresponding to the mountings of the installation space and is connected via these to the machine housing. In particular, the weighing frame is fixed on the mountings in a suspended fashion.

The weighing device is integrated into the machine housing or suspended on fixings within the machine housing. The weighing device therefore has no feet or supports of its own for a platform. It utilizes the feet of the slicing machine housing, which are supported on a flat support surface, e.g. a sales counter or a preparation table. In order to orient the weighing device exactly horizontally, it can be provided that the machine housing has height-adjustable supporting feet and the horizontal orientation of the weighing device and/or of the load carrier can be adjusted by adjusting these supporting feet. A simple check of the horizontal orientation of the weighing apparatus can take place in that the load carrier or weighing frame has an optical spirit level which can be viewed from outside the machine housing.

To prevent destruction of the bending beam or weighing apparatus under excessive load, it can be provided that the weighing frame has a limit stop, in particular an adjustable limit stop, which acts as an overload protector.

For good mechanical protection of the weighing apparatus, it can be provided that the installation space arranged in the machine housing is configured to be closed at the top facing the delivery area and is surrounded by at least two walls of the machine housing starting from the delivery area, so that the installation space and/or the load carrier is protected against the penetration of liquids from the delivery area.

In one embodiment, it can be provided that the load plate is easily removable from the weighing apparatus, e.g. for cleaning. For this purpose, the moveable end of the bending beam can be connected to the load plate via a force application element and the force application element can have a coupling apparatus which is removable without tools for mounting the load plate.

To ensure that the measurement result is as accurate as possible, and additionally to prevent the weighing apparatus from being put into operation with the load plate removed or incorrect, it can be provided that the coupling apparatus has a sensor, preferably a reed contact or a micro-switch or an optical switch, to detect the correct mounting of the load plate.

Good support of the load plate is obtained in that the coupling apparatus has a magnet for holding the load plate. Furthermore, the coupling apparatus can have a mounting aperture or multiple mounting apertures for bearing pins for the load plate.

It is provided that the weighing device can cooperate with other weighing devices or further shop scales in a retail network. For this, the weighing device or load carrier has an interface for connecting a printer and/or a display apparatus and/or an input apparatus and/or a further weighing apparatus. For particularly problem-free operation, it can be provided that the interface is configured as a digital interface, in particular as a wired serial interface for connection of a bus system or as a wireless interface.

To achieve a particularly simple procedure for a sale or repair or service of the slicing machine, it is provided that a retail unit is formed in which the slicing machine and weighing device are each packed separately for sale in their own packages. Thus, the slicing machine and weighing apparatus can each be shipped separately or the two packaging units can be supplied together to a purchaser or installation site.

An application of the slicing machine according to the invention is provided e.g. in fresh food sales for slicing sausage or cheese and selling these in any desired portion sizes.

Further embodiments and examples of the invention are shown in the figures and described below.

There are shown in.

Figure 1:
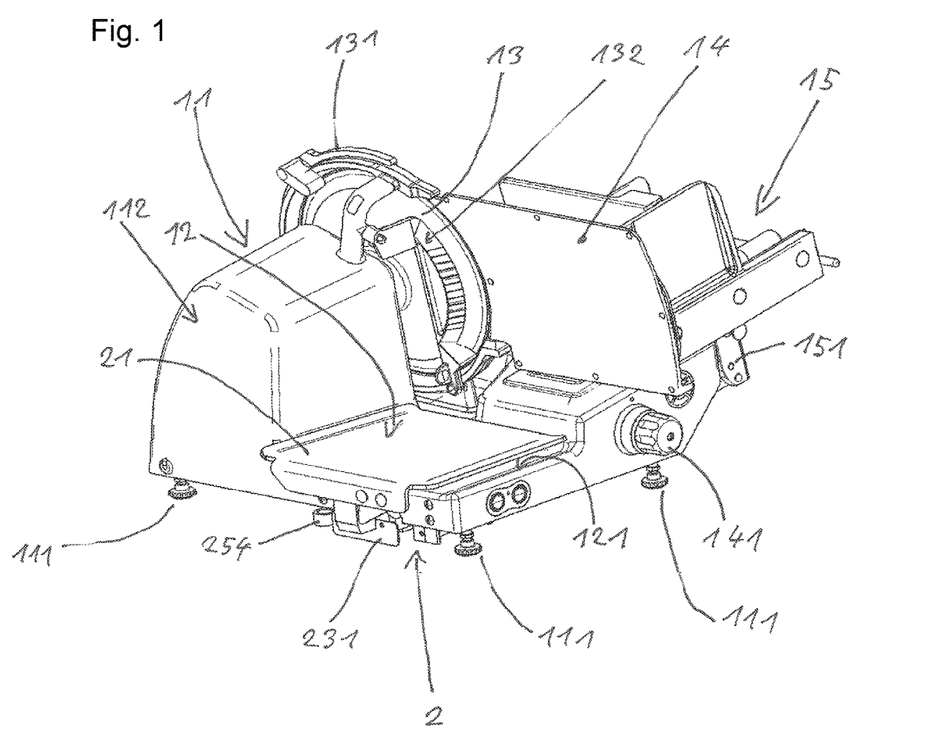
FIG. 1: a perspective view of the slicing machine according to the invention.
Figure 2:
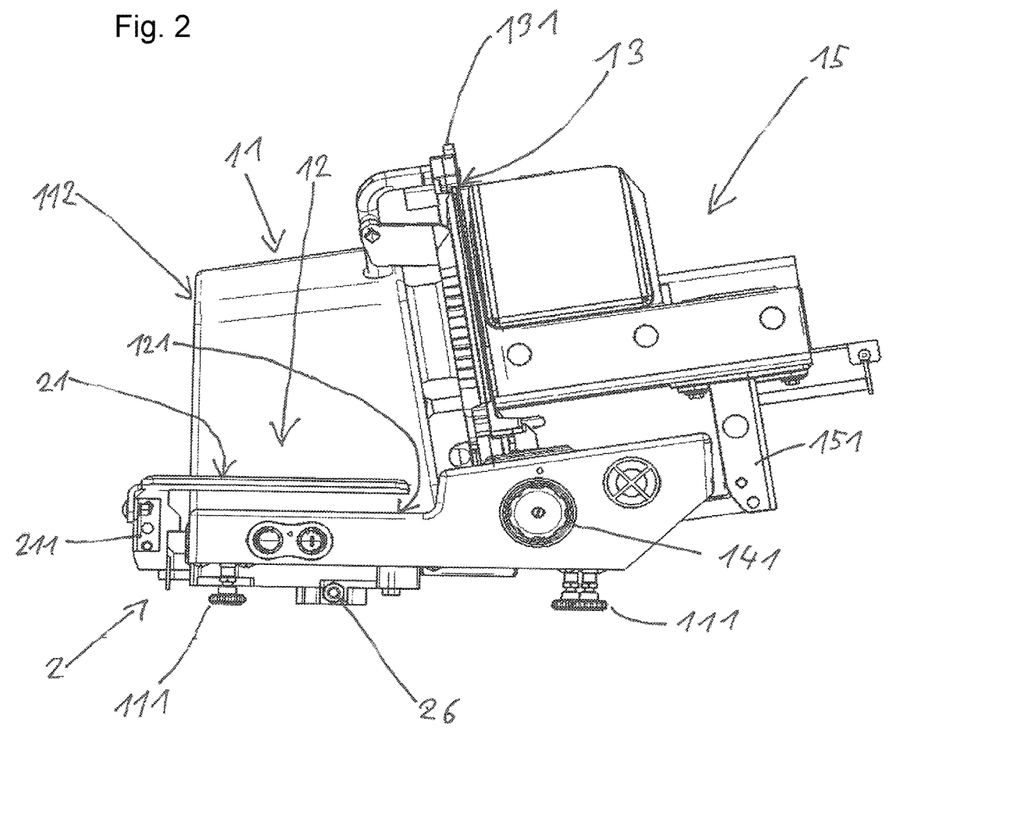
FIG. 2: the slicing machine in front view.

FIGS. 1 to 5 show an embodiment according to the invention of the slicing machine 1 with weighing device 2. FIG. 1 shows the slicing machine 1 in perspective view, wherein the delivery area 12, in which the cut slices are deposited, is illustrated in the foreground. FIG. 2 shows the same slicing machine 1 in front view, i.e. as seen by an operator standing in front of the machine and operating the machine.

The slicing machine 1 has a machine housing 11 made of aluminum, on which a rotating circular slicing blade 13 and a carriage for products to be sliced 15, which acts as a support for sliced products, are carried. The slicing blade 13 is driven by a motor and rotates in a slicing plane which runs at a right angle to the support for products to be sliced. The motor for driving the slicing blade 13 is held in the machine housing 11 or in a motor tower 112 formed therefrom. The machine housing 11 has a substantially cuboid-shaped base arranged in the lower area of the machine housing, which is configured as a pedestal with a substantially rectangular basal surface. This defines a stable platform for the machine housing 11. The motor tower 112 extends upwards from this base and forms a mounting space for the motor in its interior. The machine housing can be produced by a die casting method or a permanent mold casting method or a sand casting method.

The carriage 15 can be moved back and forth parallel to the slicing plane and is slideably mounted via a carriage foot 151 in a carriage guide of the machine housing 11. The moveable carriage 15 has a planar support for products to be sliced for receiving a preferably elongated product to be sliced, and a holder for products to be sliced. In the front area of the carriage, a contact protection is arranged to protect against accidents.

A stop plate 14 is arranged parallel to the slicing plane upstream of the slicing blade to define the slicing thickness of the separated slices. The stop plate 14 can be shifted parallel to the slicing plane via a slicing thickness adjustor 141. The product to be sliced, which sits on the carriage 15, lies against the stop plate 14 during slicing and is fed by this to the slicing blade 13 via the back and forth movement of the carriage 15, with the result that individual slices are separated off from the product to be sliced, the thickness of which slices is established via the slicing gap adjusted via the stop plate 14.

In the area downstream of the slicing blade 13, a stripper 132 is arranged, which guides the separated slices away from the slicing blade 13 and towards the delivery area 12. The slicing edge of the circular slicing blade 13 is covered by a blade protection ring 131, which surrounds the slicing edge in a C-shape and forms a contact protection for the slicing blade. Together with the stop plate 14 and the blade protection ring 131, the slicing edge of the circular blade 13 is covered all the way round.

Below the delivery area 12, a weighing device 2 is mounted within the machine housing 11. The weighing device 2 is illustrated in more detail in FIGS. 3a, 3b and 4. The weighing device 2 has a load plate 21, the support surface of which runs horizontally and extends into the delivery area 12 parallel to the surface of the machine housing 11. The surface of the machine housing 11 in the delivery area 12 is formed by a base plate 121. This base plate 121 is configured integrally with the machine housing 11. Starting from the base plate 121, side walls are provided which extend downwards, thus forming an installation space in which the weighing device 2 is mounted. To this extent, the machine housing 11 forms a U-shaped trough as an installation space for mounting the weighing device 2, in which the weighing device 2 is held.

The weighing device 2 has a load carrier 27, which comprises a weighing frame 25, a bending beam 24 and a force application element 23. Furthermore, the load carrier 27 has an electronic evaluation system, not illustrated in more detail in the figures, which evaluates and/or processes a sensor signal picked up from the bending beam 24. This electronic evaluation system can be connected via an interface 26 to other components, e.g. a printer and/or an operating and display device and/or further weighing devices. The interface 26 in this case is configured as a hard-wired serial interface and is sealed via a PG gland. A weighing result is supplied via the interface 26 to an attached operating and/or display device and displayed there. The price of the goods can be determined via an attached retail memory or merchandise management system and a price can then be calculated. If desired, the price and/or weight can then be printed out on a label via a printer attached to the interface 26. The price determination can be performed by the electronic evaluation system. Alternatively, the price determination can also take place in a separate control unit, e.g. in a CPU unit of a shop scale attached to the interface 26.

Figure 5:
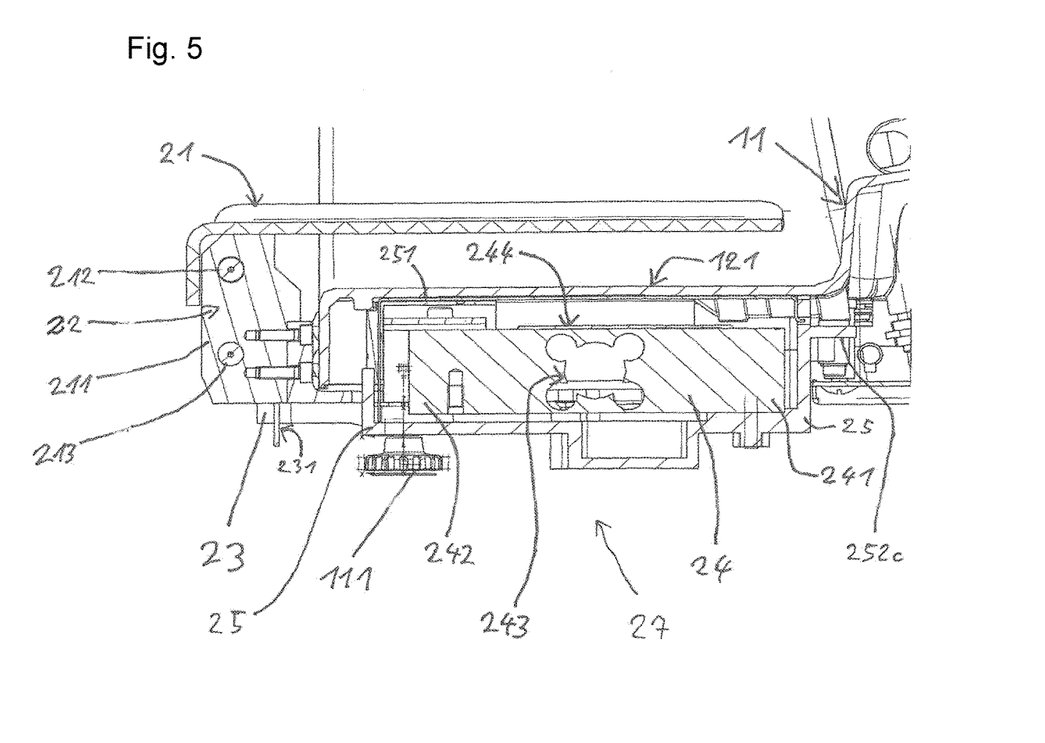
FIG. 5: a sectional illustration in the area of the weighing device.

In FIG. 5, the bending beam 24 is illustrated in more detail. The bending beam 24 is made of an aluminum element and has a fixed end 241 and a moveable end 242. The moveable end 242 is connected to the load plate 21 via a force application element 23. The fixed end 241 is firmly bolted in the weighing frame 25. The fixed area of the bending beam 241 is integrally connected to the moveable area 242 via a weakening zone 243. In the area of this weakening zone, SG (strain gauge) sensors are arranged, which detect a deformation of the bending beam. The evaluation apparatus processes or evaluates this signal supplied by the SG sensors, with the result that the weight signal can be determined therefrom.

Figure 3A:
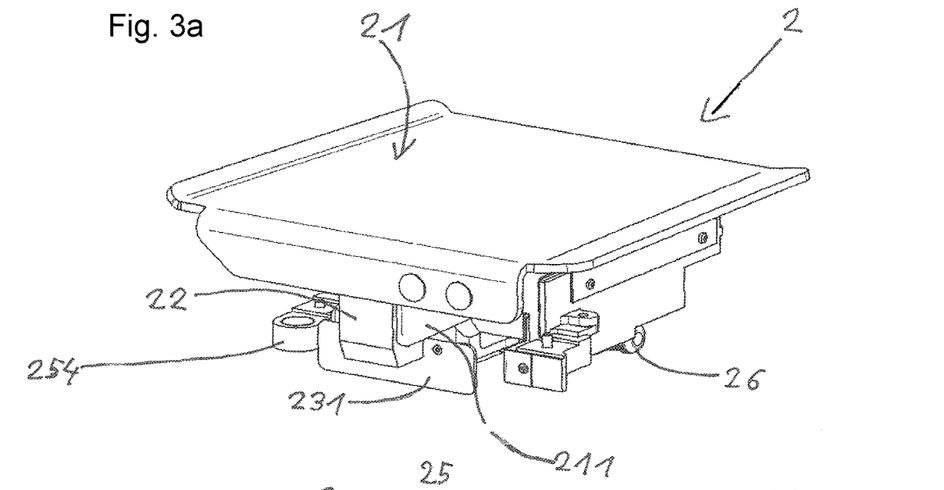
FIG. 3*a*: the weighing device in perspective view.
Figure 3B:
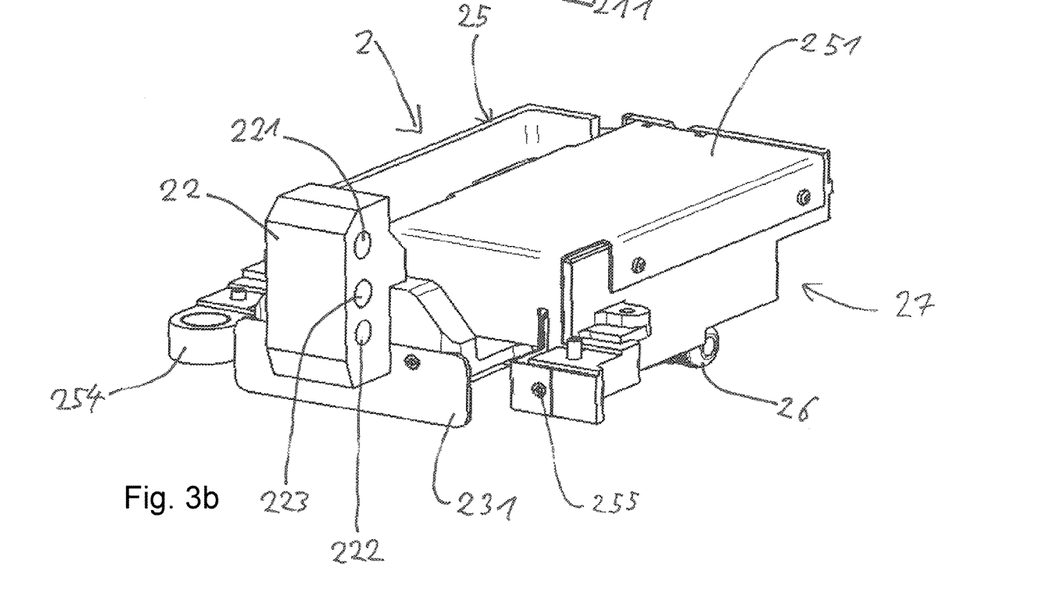
FIG. 3*b*: the weighing device without load plate.

FIG. 3a shows the weighing device 2 with load plate 21 placed thereon. The load plate has a load plate support 211, via which the load plate is held in a coupling apparatus 22 of the load-applying element 23. The coupling apparatus 22 is configured as a coupling apparatus 22 which is removable without tools, with the result that the load plate 21 can be removed from the slicing machine 1 by simple manual hand grips and cleaned e.g. in a dishwashing machine.

The coupling apparatus 22 has two horizontal recesses 221 and 222, into which two pins of the load plate support 211 can be inserted. Between these two mountings 221 and 222, a magnet 223 is provided, which cooperates with the magnetic load plate support 211 and secures the load plate 21 in the coupled position. For this purpose, the magnet 223 acts upon the load plate support 211 in the direction of the inserted position of the load plate 21, with the result that, during operation of the slicing machine 1, this is secured to the coupling apparatus 22 and mechanically rigidly connected thereto. The coupling apparatus 22 is, as illustrated in FIG. 5, connected to the load-applying element 23, which is in turn connected to the moveable end 242 of the bending beam 24. If products to be weighed or separated slices of the product to be sliced are placed on the load plate 21, the moveable end 242 of the bending beam 24 is moved downwards as a result of this frictional connection. This leads to a corresponding deformation of the bending beam 24 in the area of the weakening zone 243, which is proportional to the weight of the slices placed thereon and is detected by the strain gauges.

The machine housing 11 forms a trough, which is closed at the top towards the delivery area 12, for mounting the bending beam 24. The force application element 23 is configured such that it surrounds the wall of the machine housing 11 and extends into the installation space below the side wall of the machine housing.

The force application element 23 has a dirt protector 231, which is arranged at a distance from and parallel to the side wall of the machine housing 11. The dirt protector 231 covers the entry area of the machine housing 11 and prevents particles of dirt from being able to pass along the force application element 23 inwards into the installation space or to the load carrier 27.

Figure 4:
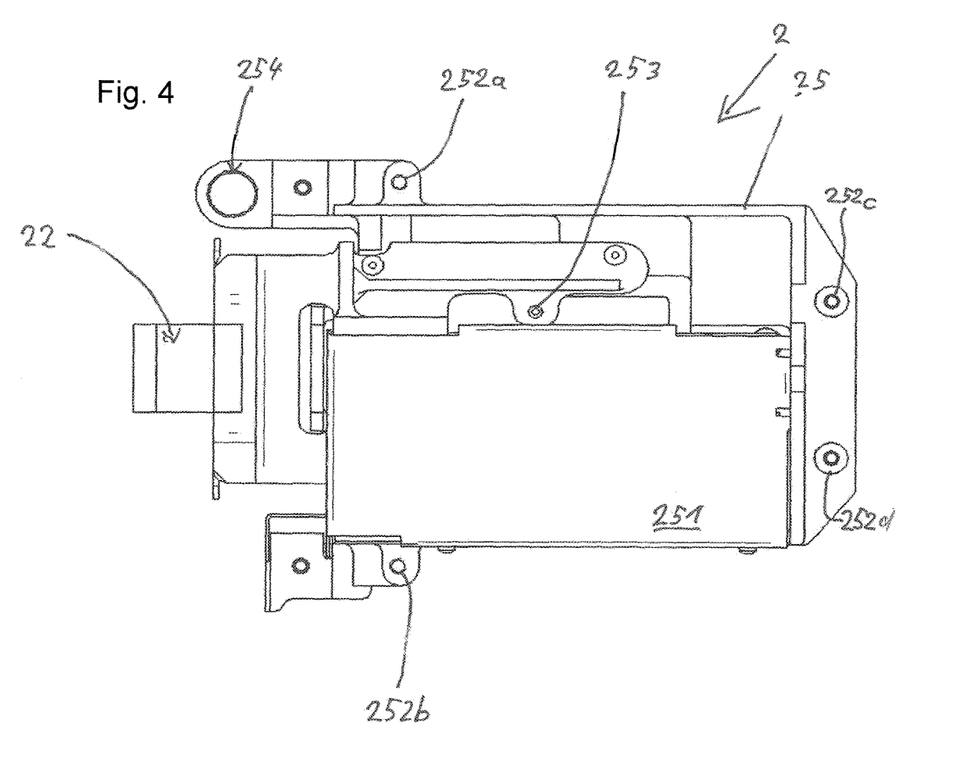
FIG. 4: a top view of the weighing device.

The weighing apparatus 2 or load carrier 27 is fixed in the machine housing 11 via the weighing frame 25. As illustrated in FIG. 4, the weighing frame 25 has four fixing points 252a, 252b, 252c and 252d. These fixing points cooperate with mountings which are arranged on the machine housing. On the back of the base plate 121, corresponding threaded holes are configured which form the mountings. The weighing frame 25 can be connected into the machine housing removably and yet mechanically rigidly via the fixing points 252a, 252b, 252c and 252d.

A shield 251 is removably connected to the weighing frame 25. The weighing frame has a closed base on its underside. In the mounting space between the base and the shield 251, the bending beam 24 and an electronic evaluation system are mounted. Together with the removable shield 251, the weighing frame 25 forms an enclosed mounting space for the bending beam 24 and the electronic evaluation system to protect these from electromagnetic disturbances and contaminations, such as e.g. water splashes or dirt particles.

The shield 251 is connected to the weighing frame 25 via threaded joints and encloses the bending beam 24 and its electronic evaluation system. A seal 255 seals one or more of the threaded joints of the shield 251. The seal 255 is arranged on the front of the weighing frame 25 in such a way that it can be viewed or read from outside the machine housing even when the weighing unit 2 is installed. In the event of a manipulation of the bending beam 24, the shield must necessarily be removed and so the seal 255 must be destroyed. A manipulation can therefore be readily detected.

For an accurate weighing result, it is necessary for the weighing apparatus 2 to be oriented exactly horizontally. In order to ensure this or to be able to adjust the horizontal orientation of the weighing apparatus 2, it is provided that the machine housing 11 has height-adjustable housing feet 111. To the weighing frame 25, an optical spirit level 254 is attached which, as illustrated in FIG. 1, can be read from outside the machine housing 11. For this purpose, the spirit level 254 runs through to the outside below the side wall of the machine housing 11. Thus, the spirit level 254 can easily be read from the outside.

To prevent destruction of the weighing apparatus 2 under excessive load, the weighing frame 25 has an overload protector 253. This is configured as a limit stop for the bending beam 24. If an excessive load is placed on the load plate 21, this leads to a correspondingly high deformation or a high deflection of the freely moveable end 242 of the bending beam 24. To prevent permanent damage to the bending beam 24 due to excessive deformation, an adjustable limit stop 253 is provided, which mechanically limits this movement of the free end of the bending beam 24.

LIST OF REFERENCE NUMBERS

1 Slicing machine
11 Machine housing
111 Housing feet
112 Motor tower
12 Delivery area
121 Base plate
13 Slicing blade
131 Blade protection ring
132 Stripper
14 Limit stop plate
141 Slicing gap adjustment
15 Carriage for products to be sliced
151 Carriage arm
2 Weighing device
21 Load plate
211 Load plate support
212 Pins
213 Pins
22 Coupling
221 Mounting aperture
222 Mounting aperture
223 Magnet
23 Force application element
231 Dirt protector
24 Bending beam
241 Fixed end
242 Moveable end
243 Weakening zone
244 SG
25 Weighing frame
251 Shield
252a, b, c, d Fixings
253 Overload protector
254 Spirit level
255 Seal
26 Interface
27 Load carrier

The invention claimed is:

1. A slicing machine for separating off slices of elongated foodstuffs, with a machine housing which holds a drive motor and a rotating slicing blade driven by the drive motor, with a delivery area arranged in the vicinity of the slicing blade for depositing the separated slices and with a weighing device, which has a load carrier arranged in an installation space of the machine housing arranged below the delivery area and a load plate arranged in the delivery area for receiving the separated slices, wherein the weighing device is configured as a separate modular unit, which can optionally be mechanically rigidly connected to the machine housing such that the separate modular unit is suspended on fixings within the machine housing, wherein the load carrier comprises a bending beam with a fixed end and a moveable end, and the moveable end can be removably and mechanically rigidly connected to the load plate and the fixed end indirectly or directly to the machine housing, and wherein the machine housing has in the installation space at least two mountings for the removable fixing of the weighing device, and the mountings are configured as at least one of screw mountings, snap mountings or bayonet mountings.

2. The slicing machine according to claim 1, wherein the at least two mountings are arranged on the underside of a base plate of the machine housing, and wherein a top of the base plate is directed towards the delivery area and the underside of the base plate closes off a top of the installation space.

3. The slicing machine according to claim 1, wherein the bending beam is fixed with its fixed end in a weighing frame of the weighing device and the weighing frame has at least two fixings corresponding to the mountings of the installation space.

4. The slicing machine according to claim 3, wherein at least one of (i) at least one of the load carrier or the weighing frame has an optical spirit level which can be viewed from outside the machine housing, or (ii) the weighing frame has a limit stop acting as an overload protector.

5. The slicing machine according to claim 4, wherein the overload protector is adjustable.

6. The slicing machine according to claim 3, wherein the weighing frame is fixed on the mountings in a suspended fashion.

7. The slicing machine according to claim 1, wherein the machine housing has height-adjustable supporting feet and at least one of horizontal orientation of the weighing device or the load carrier can be adjusted by adjusting the supporting feet.

8. The slicing machine according to claim 1,
wherein the installation space arranged in the machine housing is configured to be closed at a top towards the delivery area and surrounded by at least two walls of the machine housing starting from the delivery area, with the result that at least one of the installation space or the load carrier is protected against penetration by liquids from the delivery area.

9. The slicing machine according to claim 1,
wherein the moveable end of the bending beam is connected to the load plate via a force application element and the force application element has a coupling apparatus, which is removable without tools, for mounting the load plate.

10. The slicing machine according to claim 9,
wherein the coupling apparatus has a sensor for detecting correct mounting of the load plate.

11. The slicing machine according to claim 10, wherein the sensor is a reed contact, a micro-switch or an optical switch.

12. The slicing machine according to claim 9,
wherein the coupling apparatus has a mounting aperture or multiple mounting apertures for bearing elements of the load plate.

13. The slicing machine according to claim 9, wherein the coupling apparatus has a magnet for holding the load plate.

14. The slicing machine according to claim 1,
wherein the load carrier has an interface for connection of at least one of a printer, a display apparatus, input apparatus or a further weighing apparatus.

15. The slicing machine according to claim 14, wherein the interface is configured as a digital interface which is a wired serial interface or wireless interface.

16. A retail unit consisting of a slicing machine according to claim 1,
wherein the retail unit comprises two packages, wherein the weighing device configured as a separate modular unit is packed as one package and the slicing machine without the weighing device is packed as a second package.

17. A method for production of a slicing machine, wherein the slicing machine is for separating off slices of elongated foodstuffs and includes a machine housing which holds a drive motor and a rotating slicing blade driven by the drive motor, a delivery area arranged in the vicinity of the slicing blade for depositing the separated slices and a weighing device, which has a load carrier arranged in an installation space of the machine housing arranged below the delivery area and a load plate arranged in the delivery area for receiving the separated slices, wherein the weighing device is configured as a calibratable weighing device, and
wherein the weighing device is configured as a separate modular unit which is calibrated outside the slicing machine and is inserted into the slicing machine and mechanically rigidly connected thereto after calibration operation,
wherein the weighing device is inserted into a mounting device for calibration and in the mounting device is mechanically rigidly and removably connected to the mounting device via fixing points arranged on a weighing frame, wherein the weighing device is subsequently fixed in the slicing machine via the same fixing points.

18. The method according to claim 17,
wherein the weighing device is at least one of provided with a seal outside the slicing machine on completion of the calibration operation or connected via an interface to a display unit and at least one of a printer or a CPU unit after installation in the slicing machine.

* * * * *